United States Patent
Maltseff et al.

(10) Patent No.: US 8,106,746 B2
(45) Date of Patent: Jan. 31, 2012

(54) METHOD, APPARATUS, AND SYSTEM FOR SELECTING AND LOCATING OBJECTS HAVING RADIO FREQUENCY IDENTIFICATION (RFID) TAGS

(75) Inventors: Paul Maltseff, Edmonds, WA (US); Ronald D. Payne, Snohomish, WA (US)

(73) Assignee: Intermec IP Corp., Everett, WA (US)

( * ) Notice: Subject to any disclaimer, the term of this patent is extended or adjusted under 35 U.S.C. 154(b) by 968 days.

(21) Appl. No.: 12/067,556

(22) PCT Filed: Sep. 20, 2006

(86) PCT No.: PCT/US2006/036706
§ 371 (c)(1),
(2), (4) Date: Mar. 20, 2008

(87) PCT Pub. No.: WO2007/035833
PCT Pub. Date: Mar. 29, 2007

(65) Prior Publication Data
US 2008/0315994 A1    Dec. 25, 2008

Related U.S. Application Data

(60) Provisional application No. 60/719,083, filed on Sep. 21, 2005.

(51) Int. Cl.
*H04Q 5/22* (2006.01)
(52) U.S. Cl. .............. 340/10.1; 340/8.1; 340/572.1
(58) Field of Classification Search ............. 340/825.49, 340/8.1, 10.1, 10.5, 5.9, 572.1, 572.4, 570, 340/539.13
See application file for complete search history.

(56) References Cited

U.S. PATENT DOCUMENTS

| | | | |
|---|---|---|---|
| 3,805,265 A | 4/1974 | Lester | |
| 5,739,765 A | 4/1998 | Stanfield et al. | |
| 5,798,693 A * | 8/1998 | Engellenner | 340/10.33 |
| 5,936,527 A | 8/1999 | Isaacman et al. | |
| 6,278,413 B1 | 8/2001 | Hugh et al. | 343/818 |
| 6,714,121 B1 | 3/2004 | Moore | |
| 2003/0174099 A1* | 9/2003 | Bauer et al. | 343/893 |
| 2007/0001809 A1 | 1/2007 | Kodukula et al. | |

* cited by examiner

*Primary Examiner* — Edwin Holloway, III
(74) *Attorney, Agent, or Firm* — Seed IP Law Group PLLC

(57) ABSTRACT

A carrier structure has a plurality of cells. A corresponding plurality of objects having data carriers, such as radio frequency identification (RFID) tags, is placed in each cell. Each cell has an indicator associated therewith and is defined by walls that substantially prevent waves (such as RF waves) from propagating between cells. A control module is coupled to the carrier structure and is operative to selectively activate individual ones of the indicators. An automatic data collection device (such as an RFID reader) interrogates the data carriers of the objects placed in the cells, and the data carriers can provide response signals to the data collection device. The control module also monitors the response signals using an antenna present in each cell. If the data collection device selects a particular one of the responsive data carriers, the data collection device provides a notification signal to the control module to notify the control module of the selection. The control module then identifies and selects the cell of an object of interest having the selected data carrier affixed thereon, and initiates activation of the indicator associated with the selected cell, thereby identifying the location of the object of interest.

32 Claims, 4 Drawing Sheets

METHOD, APPARATUS, AND SYSTEM FOR SELECTING AND LOCATING OBJECTS HAVING RADIO FREQUENCY IDENTIFICATION (RFID) TAGS

CROSS REFERENCE TO RELATED APPLICATIONS

The present application is a national stage application of Patent Cooperation Treaty (PCT) Application Serial No. PCT/US2006/036706, filed Sep. 20, 2006, which in turn claims priority to U.S. Provisional Patent Application Ser. No. 60/719,083, entitled "METHOD AND APPARATUS FOR SELECTING AND LOCATING OF OBJECTS WITH RF ID TAGS," filed Sep. 21, 2005. These applications are assigned to the same assignee as the present application, and incorporated herein by reference in their entireties.

TECHNICAL FIELD

This disclosure generally relates to the field of automatic data collection (ADC), for example, data acquisition via radio frequency identification (RFID) tags and readers. More particularly but not exclusively, the present disclosure relates to selecting and locating objects having RFID tags.

BACKGROUND INFORMATION

The ADC field includes a variety of different types of ADC data carriers and ADC readers operable to read data encoded in such data carriers. For example, data may be encoded in machine-readable symbols, such as barcode symbols, area or matrix code symbols, and/or stack code symbols. Machine-readable symbols readers may employ a scanner and/or imager to capture the data encoded in the optical pattern of such machine-readable symbols. Other types of data carriers and associated readers exist, for example magnetic stripes, optical memory tags, and touch memories.

Other types of ADC carriers include RFID tags that may store data in a wirelessly accessible memory, and may include a discrete power source (i.e., an active RFID tag), or may rely on power derived from an interrogation signal (i.e., a passive RFID tag). RFID readers typically emit a radio frequency (RF) interrogation signal that causes the RFID tag to respond with a return RF signal encoding the data stored in the memory.

Identification of an RFID tag generally depends on RF energy produced by a reader or interrogator arriving at the RFID tag and returning to the reader. Multiple protocols exist for use with RFID tags. These protocols may specify, among other things, particular frequency ranges, frequency channels, modulation schemes, security schemes, and data formats.

Many ADC systems that use RFID tags employ an RFID reader in communication with one or more host computing systems that act as central depositories to store and/or process and/or share data collected by the RFID reader. In many applications, wireless communications is provided between the RFID reader and the host computing system. Wireless communications allow the RFID reader to be mobile, may lower the cost associated with installation of an ADC system, and permit flexibility in reorganizing a facility, for example a warehouse.

RFID tags typically include a semiconductor device having the memory, circuitry, and one or more conductive traces that form an antenna. Typically, RFID tags act as transponders, providing information stored in the memory in response to the RF interrogation signal received at the antenna from the reader or other interrogator. Some RFID tags include security measures, such as passwords and/or encryption. Many RFID tags also permit information to be written or stored in the memory via an RF signal.

RFID tags are generally used to provide information about the specific objects on which the RFID tags are attached. For example, RFID tags may store data that provide the identification and description of products and goods, the identity of an animal or an individual, or other information pertaining to the objects on which the RFID tags are attached.

Problems may occur when a plurality of RFID tags are attached to a corresponding plurality of objects that are located in relatively close proximity to each other, and it is necessary to select a particular object of interest among the plurality of objects. Since the object of interest may be similar or identical in visual appearance to the other objects in the plurality, it can be difficult for a user of the RFID reader to readily locate the object of interest, even if the RFID reader has successfully interrogated the specific RFID tag attached to the object of interest—the user simply sees a cluster of similar or identical objects and cannot readily differentiate the object of interest (that had the appropriately responsive RFID tag) from the other objects.

Some semi-automated or fully automated techniques are available to assist the user in locating an object of interest. Such techniques can be performed with some degree of automation using the appropriate instrumentation and algorithms in RFID readers and/or other devices. Such techniques may also be performed manually.

As an example, a known technique to identify the location of an object is through triangulation. With one triangulation technique, the relative position of two or more points of reference is calculated based on two vertices of a triangle (e.g., two angles of the triangle at the points of reference) and the measurable length of a side of the triangle (e.g., a baseline or base of the triangle) between the two vertices. The object of interest is at a third vertex/point of the triangle, and can be located using geometric formulas.

In another triangulation technique, one angle of a triangle and the distance between two points (e.g., a distance between a vertex of the triangle forming a point of reference and the object of interest) are used. Again, geometric formulas can then be used to obtain the location of the object of interest.

Still another technique (for identifying a location of an object of interest) is based on the identification of the intersection point of three circles having diameters equal to distances between points of reference and the object of interest. Geometric formulas are used to obtain the location of the object of interest.

Another technique for identifying the location of object of interest is based on the employment of spatially distributed antennas (for example, an array of antennas) receiving signals from the object of interest. The differences in distances between different antennas and the object of interest would result in phase shifts of receiving signals in said antennas. Applying simple formulas, one skilled in the art can calculate actual differences in distances between the object of interest and each antenna and can determine the location of the object of interest using above described triangulation technique(s).

The various techniques discussed above (whether manual or having some degree of automation) suffer a number of drawbacks. For instance, the instrumentation used for automatically calculating angles and distances can be imprecise in their results. With manual techniques for identifying the location of the object of interest, the user often has to "guess" the location or otherwise search (visually or manually) in the general area where the object of interest may be located, which may perhaps require re-interrogating the general area again in an effort to identify the object of interest. This imprecision and guesswork/searching is inefficient.

BRIEF SUMMARY

One aspect provides a system that includes a carrier structure having a plurality of cells. The cells are adapted to allow objects having respective data carriers affixed thereon to be placed in respective ones of the cells. Indicators are respectively associated with the cells. An automatic data collection device communicates with the data carriers affixed to the objects placed in the respective ones of the cells and selects at least one of the data carriers affixed to one of said objects that is an object of interest. A control module can be communicatively coupled to the indicators and is responsive to the data collection device to select at least one of the indicators to activate. The selected indicator is associated with one of said cells that has the object of interest placed therein and is adapted to provide an indication of a location of the object of interest.

BRIEF DESCRIPTION OF THE SEVERAL VIEWS OF THE DRAWINGS

Non-limiting and non-exhaustive embodiments are described with reference to the following drawings, wherein like reference numerals refer to like parts throughout the various views unless otherwise specified. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
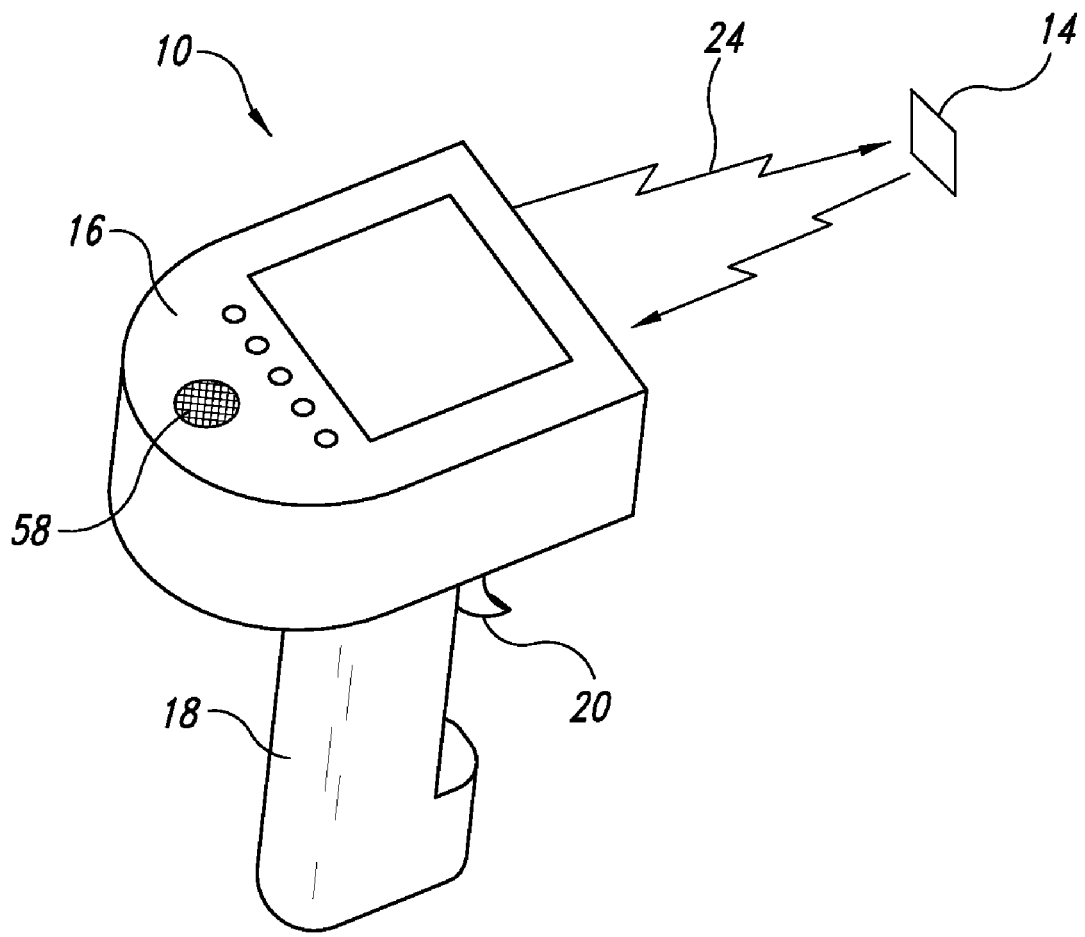
FIG. 1 is an upper perspective view of an embodiment of a data collection device interrogating and/or reading at least one RFID tag.

Embodiments of techniques to select and locate an object having an RFID tag or other type of data carrier are described herein. In the following description, numerous specific details are given to provide a thorough understanding of embodiments. One skilled in the relevant art will recognize, however, that the embodiments can be practiced without one or more of the specific details, or with other methods, components, materials, etc. In other instances, well-known structures, materials, or operations associated with RFID tags and RFID readers, computer and/or telecommunications networks, and/or computing systems are not shown or described in detail to avoid obscuring aspects of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

As an overview, one embodiment provides a technique to select and uniquely identify a location of an object of interest having a data carrier, such as an RFID tag. The object of interest and other objects having data carriers are placed in cells defined by a carrier frame of a carrier structure. The walls of each cell are made of a material that prevents or attenuates the propagation of signals (such as return signals generated by the data carriers) from one cell to another cell. An antenna is present in each of the cells to receive the return signals generated by the data carriers.

An indicator is associated with each cell. The antennas and indicators are communicatively coupled to a control module. The control module can establish a communication link with a data collection device.

In operation, a data collection device (such as an RFID reader) interrogates or otherwise communicates with one or more of the data carriers respectively affixed to objects placed in the cells. One or more return signals from the data carrier(s) are monitored by the control module via the antennas. The data collection device also receives the return signals. The data collection device selects one of the objects as the object of interest based on the communication of return signal(s).

The data collection device sends a notification signal to the control module, via the communication link, to notify the control module that the object of interest has been selected. Based on the notification signal and the monitored return signal(s), the control module can identify which of the objects in the respective cells of the carrier frame is the object of interest. After the control module identifies the object of interest, the control module selects the object's associated cell and activates the indicator for that cell. The activated indicator allows a user to readily locate the object of interest from among the other objects present in the carrier structure.

FIG. 1 shows an automatic data collection device 10 for reading one or more target data carriers, such as one or more RFID tags 14. The RFID tags 14 can comprise active RFID tags, passive RFID tags, or combination of both active and passive RFID tags. In other embodiments, the target data carriers can comprise acoustical tags or other types of tags different from RFID tags, or can comprise any combination of RFID tags and such non-RFID tags. For the sake of simplicity of explanation hereinafter and unless otherwise indicated, the target data carrier(s) will be described in the context of the RFID tag 14.

The data collection device 10 includes a head 16, a handle 18 and a trigger 20. While the trigger 20 is shown with a specific shape and in a specific location in the embodiment of FIG. 1, other embodiments may employ different arrangements. For example, the trigger 20 can be embodied as a side-mounted finger trigger, top-mounted thumb trigger, button or key, touch screen, and other trigger arrangements. One embodiment further provides a proximity trigger 20, which uses optics, acoustics, or other mechanism to determine proximity of an object to automatically activate.

The data collection device 10 can comprise a portable data collection device, a hand-held scanning device, or other suitable electronic device having the various data reading and/or writing capabilities described herein and further including capability for communicating with or otherwise cooperating with a control module to identify a location of an object of interest on which the RFID tag 14 is affixed, as will be described in further detail below. The data collection device 10 can also comprise a stationary device with limited or no portability, such as a data collection device located near a conveyor belt or other platform that movably place objects having RFID tags 14 affixed thereon within reading range of the stationary data collection device 10.

It is appreciated that some embodiments of the data collection device 10 are provided that may not necessarily have the same shape or identical features or identical use as the embodiments illustrated in the various figures. However, such embodiments can nevertheless include features to facilitate selecting and locating an object having the RFID tag 14 affixed thereon.

The RFID tag 14 can be read using electromagnetic radiation, radio frequency (RF), and the like (generically depicted as energy 24) that is directed to and returned from the RFID tag 14. In the context of acoustical target data carriers, the energy 24 can be in the form of acoustical energy.

Figure 2:
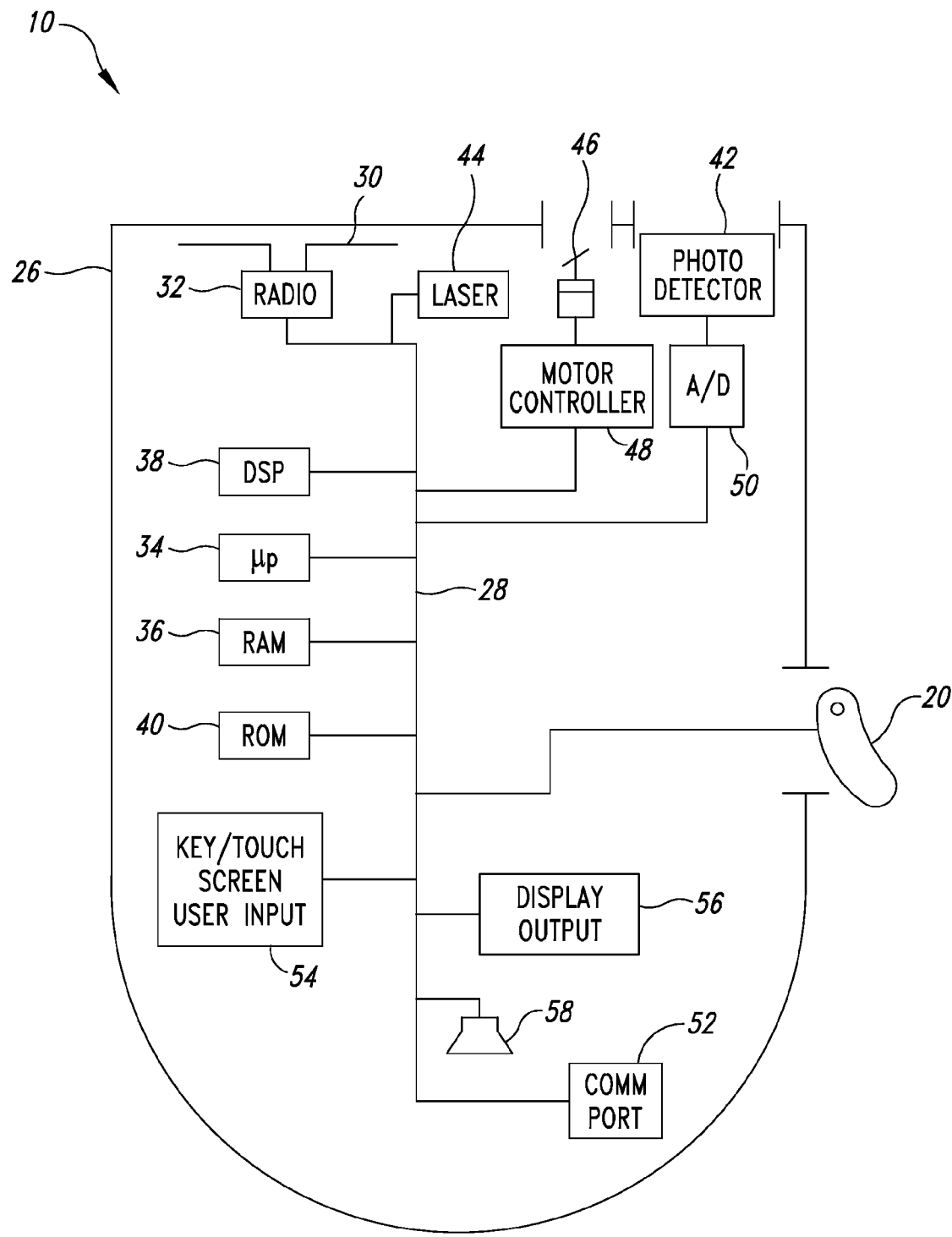
FIG. 2 is a block diagram of an embodiment of a data collection device.

As shown in the embodiment of FIG. 2, the data collection device 10 has a housing 26 that carries various components, symbolically shown as being coupled together via a bus 28. The bus 28 provides data, commands, and/or power to the various components of the data collection device 10. The data collection device 10 can include an internal power source such as a rechargeable battery (not shown), or can receive power from an external power source such as a wall outlet by way of an electrical cord (not shown).

With regards to components associated with wirelessly reading data stored in the RFID tag 14, FIG. 2 shows an antenna 30 electrically coupled to a radio 32. The radio 32 is coupled via the bus 28 to a microprocessor 34 (or other processor) and a random access memory (RAM) 36. The RAM 36 can include one or more buffers or other storage locations to store information read from an RFID tag and/or to store other information associated with cooperating with external and/or internal components to locate an object associated with the RFID tag 14.

While FIG. 2 shows a single microprocessor 34, the data collection device 10 may include separate dedicated processors for reading RFID tags, acoustical tags, barcodes, other machine-readable symbols, and the like, if the data collection device 10 is a "multi-mode" device that is capable of reading data carriers other than RFID tags, for example. Moreover, in one example embodiment at least one digital signal processor (DSP) 38 may be provided to cooperate with the microprocessor 34 to process signals and data returned from the data carriers.

While a dipole antenna 30 is shown, the data collection device 10 can employ other antenna designs. Of course, the antenna 30 can be selected to achieve a particular focus, for example, a highly directional antenna can enhance the ability of the data collection device 10 to direct an interrogation signal to a single RFID tag out of a group of RFID tags. The radio 32 can take the form of a transceiver capable of transmitting and receiving at one or more of the frequencies commonly associated with RFID tags 12 (e.g., 13.5 MHz, 433 MHz, 860-960 MHz, 2.4 GHz, and others). While these frequencies typically fall within the radio frequency range of the electromagnetic spectrum, the radio 32 can successfully employ frequencies in other portions of the spectrum. Antenna design and radios are generally discussed in The ARRL Handbook for Radio Amateurs 2003, by Dana George Reed (Editor), American Radio Relay League, Newington, Conn., U.S.A. (October 2002) (ISBN: 0872591921), and in commonly assigned U.S. Pat. No. 6,278,413, issued Aug. 21, 2001, entitled "ANTENNA STRUCTURES FOR WIRELESS COMMUNICATIONS DEVICE, SUCH AS RFID TAG."

A read only memory (ROM) 40 stores instructions for execution by the microprocessor 34 to operate the radio 32 or other components of the data collection device 10. As used in this herein, ROM includes any non-volatile memory, including erasable memories such as EEPROMs. The programmed microprocessor 34 can control the radio 32 to emit an interrogation signal, including any required polling codes or encryption, and to receive a return signal from an RFID tag.

In an embodiment, the ROM 40 or other machine-readable storage medium in the data collection device 10 can store software or other machine-readable instructions executable by the microprocessor 34 to cooperate with external components (discussed in further detail below) to assist in identifying the location of an object having the RFID tag 14 that has been read by the data collection device 10.

If the embodiment of the data collection device 10 is a "multi-mode" device that can read other types of data carriers, in addition to RFID tags 14, then FIG. 2 illustrates other components related to reading such other types of data carriers that can be present in the data collection device 10. For instance, symbol reading components of the data collection device 10 for reading a barcode symbol can comprise a light source (such as a laser 44) to provide a scanning beam and a photo detector 42 to detect the returned light from the barcode symbol. The data collection device 10 can employ suitable optics such as lens and mirrors 46, controlled by a motor controller 48, for directing modulated light returned from the barcode symbol to the photo detector 42. Alternatively or additionally, the lens and mirrors 46 and motor controller 48 can be used for directing the scanning beam from the laser 44 to the target barcode symbol. An analog-to-digital (A/D) converter 50 transforms the analog electrical signals from the photo detector 42 into digital signals for use by the microprocessor 34. The bus 28 couples the digital data from the A/D converter 50 to the microprocessor 34 and the RAM 36.

Symbol reading and decoding technology is well known in the art and will not be discussed in further detail. Many alternatives for image sensors, symbol decoders, and optical elements that can be used in the data collection device 10 are taught in the book, The Bar Code Book, Third Edition, by Roger C. Palmer, Helmers Publishing, Inc., Peterborough, N.H., U.S.A. (1995) (ISBN 0-911261-09-5). Useful embodiments can also be derived from the various components disclosed in U.S. Pat. No. 6,286,763, issued Sep. 11, 2001, and assigned to the same assignee as the present application.

An embodiment of the data collection device 10 can include a communication port 52 to provide communications to external devices. The communication port 53 can be a hardwire or wireless interface, and can even employ the antenna 42 and radio 44. The communication port 52 can provide communications over a communications network (not shown) to a host (not shown), thereby allowing transmissions of data and/or commands between the data collection device 10 and the host, and can further provide communications between the data collection device 10 and external components operative to identify the location of an object having the RFID tag 14 affixed thereon. The communications network can take the form of a wired network, for example a local area network (LAN) (e.g., Ethernet, Token Ring), a wide area network (WAN), the Internet, the World Wide Web (WWW), wireless LAN (WLAN), wireless personal area network (WPAN), and other network. Alternatively or additionally, the communications network can be a wireless network, for example, employing infrared (IR), satellite, and/or RF communications.

The data collection device 10 includes a keypad, mouse, touch screen, or other user input device 54 to allow user input. It is appreciated that other devices for providing user input can be used. The user input device 54 is usable to allow the user to select modes (e.g., modes for reading barcodes or other symbols, RFID tags, optical tags, etc.), turn the data collection device ON/OFF, adjust power levels, initialize and conduct operations with external components to facilitate identification of locations of objects having RFID tags affixed thereon, and other operations. The bus 28 couples the user input device 54 to the microprocessor 34 to allow the user to enter data and commands.

In the symbol-reading mode, the microprocessor 34 decodes and retrieves the data encoded in the data carrier, as received and processed by the photo detector 42 and the A/D converter 50. The DSP 38 may also be used to process the received data. In the RFID tag-reading mode, the microprocessor 34 operates the radio 32 to emit an interrogation signal and to receive a response from one or more RFID tags 14 to the interrogation signal. The microprocessor 34 decodes the response signal to retrieve the data encoded in the RFID tag 14.

The bus 28 also couples the trigger 20 to the microprocessor 34. In response to activation of the trigger 20, the microprocessor 34 can cause the laser 44 to emit a laser beam when the data collection device 10 is operating in the symbol-reading mode. In one embodiment, the microprocessor 34 can also cause the radio 32 and antenna 30 to emit an interrogation signal in response to the activation of the trigger 20 while the data collection device 10 is operating in the RFID tag-reading mode.

The data collection device 10 includes human-perceptible visual (e.g., display output) and audio indicators 56 and 58 respectively. The bus 28 couples the visual and audio indicators 56 and 58 to the microprocessor 34 for control thereby. The visual indicators 56 take a variety of forms, for example: light emitting diodes (LEDs) or a graphic display such as a liquid crystal display (LCD) having pixels.

The audio indicator 58 can take the form of one or more dynamic, electrostatic or piezo-electric speakers, for example, operable to produce a variety of sounds (e.g., clicks and beeps), and/or frequencies (e.g., tones), and to operate at different volumes. Such sounds can convey various types of information, such as whether a data carrier was successfully or unsuccessfully read.

Figure 3:
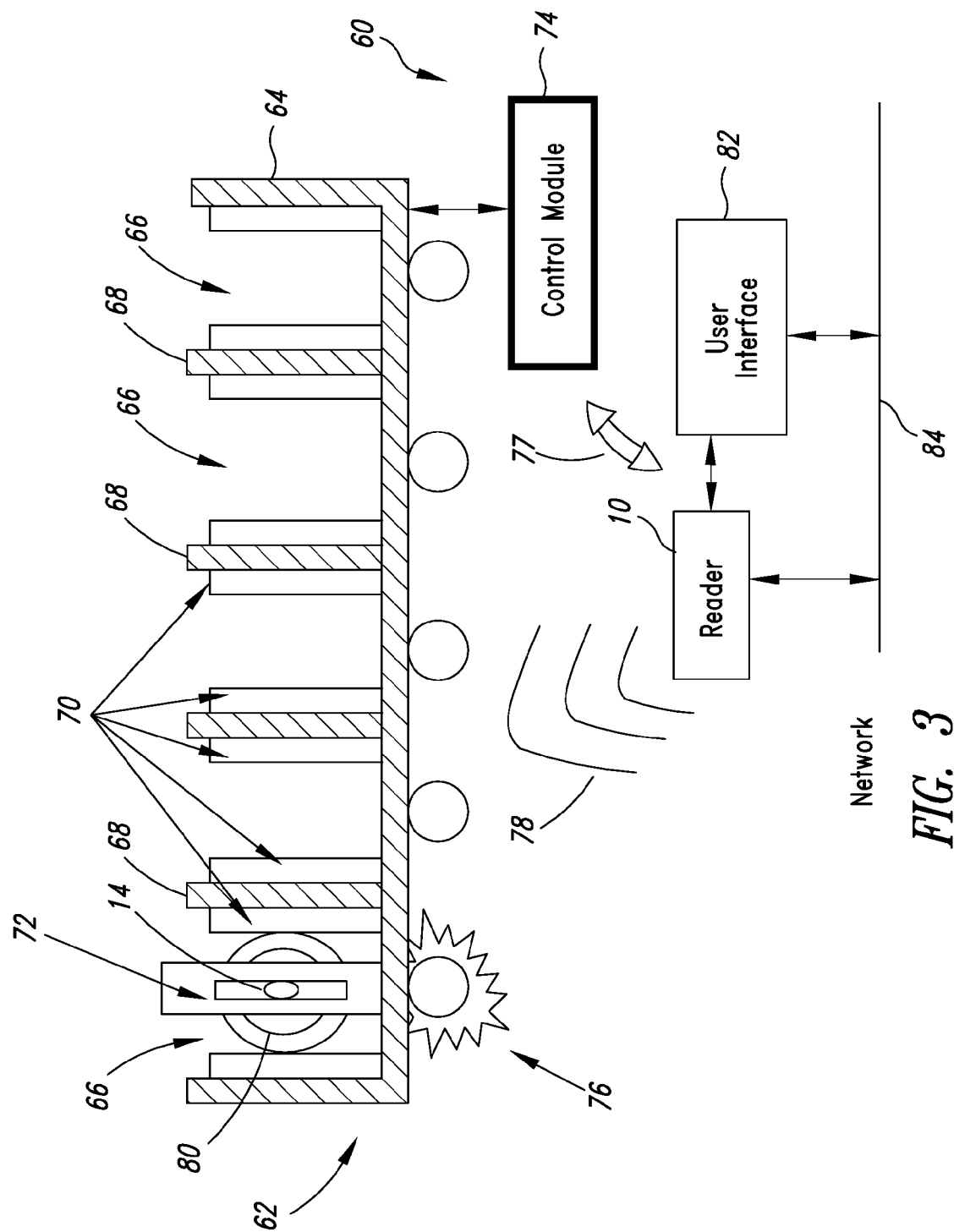
FIG. 3 is a diagram of one embodiment of a system to select and locate an object having an RFID tag.

Referring next to FIG. 3, shown generally at 60 is an embodiment of a system to select and locate an object having an RFID tag affixed thereon. The system 60 includes a carrier structure 62 having a carrier frame 64. The carrier frame 64 includes a plurality of spatially distributed cells 66 defined by walls 68 of the carrier frame 64. Each cell 66 has at least one antenna 70 present therein.

One or more objects 72 having an RFID tag 14 affixed thereon can be placed in each cell 66. The object 72 can comprise an item, a packaging or label for the item, a container of multiple packaged or unpackaged items, or other type of object that is capable of having the RFID tag 14 attached thereon. Examples of the item can include drugs, toys, food, animals, merchandise, human beings, machinery parts, or other type of animate or inanimate item that can be identified or otherwise represented by the RFID tag. In the context of human beings, for example, the item can include an identification card, driver's license, airline boarding pass, article of clothing, luggage, and so forth.

Accordingly, the carrier structure 62 can be implemented as any type of suitable portable or stationary structure to accommodate such objects 72, where the location of individual ones of the objects 72 need to be identified. Examples of the carrier structure 62 can include, but are not limited to, a cart, an inventory shelf, a shipping container, a storage unit (such as a warehouse or other storage structure), a pallet board or other product holder, a vehicle, a waiting/processing room for people (such as in airports, restaurants, hospitals, or other places where people need to be sorted, identified, and located), a file room, and so forth.

In an embodiment, each cell 66 is sized to accommodate or otherwise receive one object 72. In other embodiments, more than one object 72 and their respective RFID tags 14 can be placed in each cell 66. The number of objects 72 and their respective RFID tags 14 that can be placed in each cell 66 can be based on factors such as, but not limited to, the size and shape of each cell 66, the size and shape of each object 72, the type of object to be placed in each cell 66, the desirability or undesirability of placing more than one object in each cell 66, and so forth.

For instance, it may be desirable in some instances to place just a single object 72 in each cell 66 so as to further facilitate locating that specific object 72, as opposed to placing multiple objects 72 in a same cell 66 wherein a specific one of the multiple objects has to be located. As another consideration, it may be permissible or desirable in some instances to place multiple identical objects 72 in a particular one or more cells 66, while other cells 66 may have different or mixed objects 72. For instance, a first cell 66 can contain multiple bottles (having respective RFID tags affixed thereon) of drug A; a second cell 66 can contain multiple bottles (having respective RFID tags affixed thereon) of drug B; and so forth. In such a situation, the cells 66 are being used to organize the bottles of drugs into respective common cells 66 according to drug type.

In an embodiment, all of the cells 66 in a same carrier frame 64 have substantially a same shape and/or size. In other embodiments, the size and/or shape of the cells 66 in a same carrier frame 64 may not be uniform or otherwise similar from one cell 66 to another.

In an embodiment, the walls 68 of the cells 66 are adapted to substantially prevent or decrease (attenuate) the distribution of electromagnetic waves (in the case of RFID tags) and/or acoustical waves (in the case of acoustical tags) between cells 66. For example, the walls 66 can be made of a material that absorbs or otherwise attenuates such waves incident thereon. Examples of such a material can include wood, plastic, rubber, foam, or other synthetic or natural material (or combination thereof) that provide suitable attenuation qualities.

As another example, the material of the walls 68 at least partially can be made of a metal-based material (and/or other material covered with metal) so as to cause the waves to propagate (such as by backscattering, reflections, etc.) only within the confines of each cell 66. It is to be appreciated that such metal material may also cause attenuation of such waves, and further appreciated that the material having attenuation properties previously described above may also exhibit reflective properties. A person skilled in the art having the benefit of this disclosure can select the type of suitable material(s) to use for the walls 68 and/or to cover the walls 68 so as to substantially reduce or prevent propagation of waves from one cell 66 to another cell 66.

Moreover in an embodiment, the walls 68 can be structured in such a manner so as to at least partially enclose each cell 66. For instance, one of the walls 68 of each cell 66 can comprise a door that can be at least partially opened to remove the object 72 from the cell 66, and that can be at least partially closed to enclose the object 72 within the cell 66. A completely closed cell 66 can substantially eliminate propagation of waves from one cell 66 to another, for example, if the walls 68 are made of a material that materially impedes the passage of waves therethrough and/or fully encloses the cell 66 such that no openings are present to allow leakage of waves into another cell 66.

According to various embodiments, the antenna 70 in each cell 66 can be installed permanently or temporarily deployed within each cell 66. Permanent installment can involve stapling, nailing, strapping, or other suitable attachment to structures of the walls 68 (e.g., beams, surfaces, shelving, etc.). Temporary installment can involve taping, hanging off hooks, laying, or other removable installation on the structures of the walls 68. Whether permanently or temporarily installed, the antennas 70 can be deployed in a manner that accommodates the contours or other physical features of the walls 68 of the cells 66. For instance, segments of the antennas 70 can be drilled through, wrapped over, hung from, or run/attached alongside the contours of the walls 66.

Additional examples for deploying antennas and using antennas in enclosures are disclosed in co-pending U.S. application Ser. No. 11/404,510, entitled "METHOD AND SYSTEM FOR READING OBJECTS HAVING RADIO FREQUENCY IDENTIFICATION (RFID) TAGS INSIDE ENCLOSURES", filed Apr. 14, 2006, and assigned to the same assignee as the present application. This co-pending application is incorporated herein by reference in its entirety.

In an embodiment, the antennas 70 operate to receive signals from or to send signals to the RFID tags 14 respectively attached to the objects 72. For instance, the antenna 70 in each of the cells 66 operates to receive the return signal (and/or scattered or reflected signals resulting from the return signal) transmitted from the RFID tag 14 in that cell, in response to interrogation of that RFID tag by the data collection device 10. The antenna 70 can also operate to interrogate the object 72 in that cell 66, alternatively or additionally to the interrogation signal from the data collection device 10.

The antennas 70 are operatively coupled to a control module 74. In one embodiment, conductive connections from the antennas 70 to the control module 74 can be provided. Examples of such conductive connections can include wire or conductive traces running through the frame 64 or on surfaces thereof, for example. In another embodiment, wireless connections between the antennas 70 and the control module 74 can be provided, alternatively or additionally to the conductive connections. Such wireless connections can use optical, RF, microwave, or other type of wireless signal(s).

The control module 74 of an embodiment can comprise hardware, software, and/or a combination of both hardware and software. An embodiment of the control module 74 can include at least one processor and a machine-readable medium having machine-readable instructions stored thereon that are executable by the processor. As will be explained in further detail below, the control module 74 can cooperate with the data collection device 10 to locate an object 72 of interest in the carrier structure 62.

In one embodiment, the control module 74 can comprise an RF module and can selectively control each of the antennas 70. For example, a first antenna 70 in a first cell 66 can be activated to receive return signals from the RFID tag 14 present therein (thereby allowing the control module 74 to sense the backscattered or transmitted signal from that RFID tag 14), while a second antenna 70 in a second cell 66 can be activated to interrogate the RFID tag 14 present therein or to perform some other purpose.

Each of the cells 66 has one or more indicators 76 associated therewith. Each indicator 76 of an embodiment is adapted to provide a human-perceptible indication that the object 72 present in the corresponding cell 66 is the object of interest, thereby providing an identification of the location (e.g., location of the specific cell 66) of the object of interest. The indicators 76 can be operatively coupled to and controlled by the control module 74, such as via hardwire and/or wireless connections. The details of the manner in which the control module 74 can operate to selectively activate the indicator 76 corresponding to the object of interest 72 will be provided later below.

The indicators 76 can be embodied in various forms and placed in a suitable location proximate to the carrier frame 64 to allow a user to readily view the indicators 76, such as on exterior surfaces proximate to each cell 66. Visual indicators may be produced by selectively actuable light sources, such as light emitting diodes (LEDs) or incandescent light bulbs. For instance, in an embodiment where an LED is placed proximate to each cell 66, an LED corresponding to the cell 66 of the object of interest may turn ON, while the LEDs corresponding to other cells 66 are turned OFF.

Alternatively, or additionally, the visual indicators may be produced by one or more selectively actuable/operable portions (e.g., pixels) of one or more liquid crystal displays (LCDs). Alternatively, or additionally, the visual indicators can be produced by one or more individually addressable and selectively operable pixels of a display device such as a cathode ray tube (CRT), field emission display (FED), or plasma display, which can be mounted on the carrier frame 64. The activated pixels of the display can provide, for instance, a cell ID number where the object of interest is located or some other text (such as "OBJECT IS HERE").

Further alternatively or additionally, the pixels can all comprise the same color but have different intensities corresponding to different locations (e.g., a brightest pixel intensity on a display associated with the cell 66 having the object of interest, as compared to lower pixel intensity for other cells 66). Thus, different types of indications can be provided by the visual indicators. The system 60 can employ any of a variety of technologies to produce the display to identify the location of the object of interest including, but not limited to, LED, incandescent, LCD, CRT, FED, lasers, and so forth.

In other embodiments, audible indicators can be provided alternatively or additionally to visual indicators. Such audible indicators can mimic the feed back provided by the visual indicators, via use of audible beeps, pulses, tones, recorded or synthesized human voice audio (e.g., "Please select cell number 5"), and other audio to identify the location of the object of interest.

In still other embodiments, other types of indicators can be used alternatively or additionally to visual and/or audio indicators. Examples include tactile indicators that identify the specific cell 66 of the object of interest, using heat, vibration, or other tactile indicator that can be perceived by a human and used to identify specific ones of the cells 66.

In an embodiment, the control module 74 is adapted to communicate with the data collection device 10 via a communication link 77. The communication link 77 can comprise a wireless link, a hardwire link, or a combination of both wireless and hardwire links. In an embodiment, the control module 74 and the data collection device 10 are capable to establish the communication link 77 with each other when the data collection device 10 is in proximity to the control module 74. The communication port 52 of the data collection device of FIG. 2 can be used establish and maintain the communication link 77.

For purposes of illustration in FIG. 3, the data collection device 10 is depicted as an RFID reader. In such an implementation, the data collection device 10 of FIG. 3 can use its radio 32 and antenna 30 of FIG. 2 to directly send signals 78 (such as interrogation signals, write signals, and the like) to the RFID tags 14 that are affixed to the objects 72 present in the cells 66. Alternatively or additionally, the control module 74 can receive the signals 78 sent by the data collection device 10 of FIG. 3 and then convey such signals 78 to appropriate ones of the RFID tags 14 present in the cells 66 using the antennas 70.

With regards to signals 80 (such as return signals) from each one of the RFID tags 14 affixed to the objects 72 in the cells 66, the antenna 30 present in the data collection device 10 of FIG. 3 can receive the signals 80 directly from the RFID tag(s) 14. Alternatively or additionally, the control module 74 can receive the signals 80 via the antennas 70 present in the cells 66, and then convey the signals 80 (and/or the content thereof) to the data collection device 10 by using the communication link 77.

The data collection device 10 of FIG. 3 can be coupled to a user interface 82. In one embodiment, the user input device 54 of FIG. 2 can provide the user interface 82. Alternatively or additionally, the user interface 82 can be located external to the data collection device 10, such as at a host computer.

The data collection device 10 and/or the user interface 82 can communicate with a wired and/or wireless network 84. The communication port 52 of the data collection device 10 can be used to establish and conduct communications with the network 84.

Figure 4:
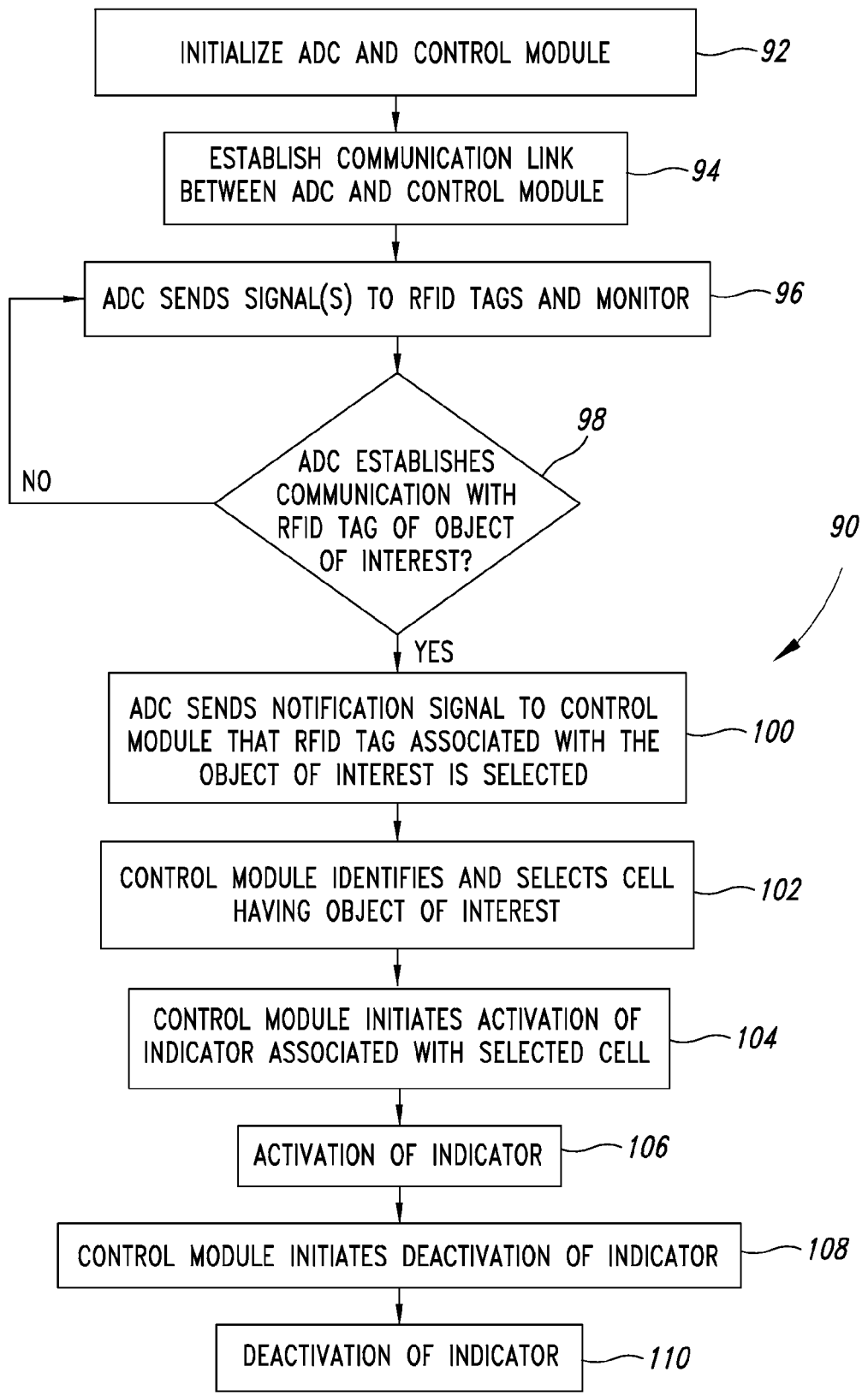
FIG. 4 is a flowchart of an embodiment of a method usable by the system of FIG. 3 to select and locate an object having an RFID tag.

FIG. 4 is a flowchart of an embodiment of a method 90 to select and locate an object 72 of interest having the RFID tag 14 (or other type of data carrier, such as an acoustical tag), using the system 60 of FIG. 3. It is appreciated that the various operations in the flowchart of FIG. 4 need not necessarily occur in the exact order shown. Moreover, certain operations can be added, removed, modified, or combined.

In some embodiments, certain operations of the method 90 can be implemented in software or other machine-readable instruction stored on a machine-readable medium and executable by a processor. For example, some of the operations in the method 90 can be performed by the control module 74 in one embodiment, using one or more processors and a storage medium of the control module 74.

Beginning first at a block 92, the automatic data collection device 10 and the control module 74 are initialized. Initialization can include, for example, turning ON or otherwise activating the data collection device 10 and the control module 74, setting the data collection device 10 (if a multi-mode device) to an RFID tag reading mode, clearing non-persistent memories (such as RAM) of the data collection device 10 and control module 74, and so forth.

At a block 94, the communication link 77 for sending control information and/or data is established between the control module 74 and the data collection device 10. In one embodiment, the communication link 77 can be automatically established when the data collection device 10 and the control module 74 are placed in range of one another. In another embodiment, user action can be used to initiate the establishment of the communication link 77, such as by activating the appropriate commands to communicate using the user input device 54 of the data collection device 10.

At a block 96, the data collection device 10 sends one or more signals 78 (such as interrogation signals) to the RFID tags of respective objects 72 located in the cells 66 of the carrier structure 62. The signal(s) 78 can be sent to all of the RFID tags 14 of the respective objects 72, to a plurality of such RFID tags 14 that is a number less than all of the RFID tags 14, and/or to individual ones of such RFID tags 14. A person skilled in the art having the benefit of this disclosure will appreciate that the scope, duration, timing, sequence range, etc. of such signal(s) 78 can be based on a number of factors, including but not limited to, a particular interrogation protocol being used, the distribution and concentration of the RFID tags within a given area, the features and capabilities of the RFID tags 14 and/or the data collection device 10, and so forth.

In one embodiment, the data collection device 10 sends the signals 78 at the block 96 directly to the RFID tags 14. In another embodiment, the control module 74 can alternatively or additionally receive such signals 78 from the data collection device 10 through the communication link 77 or through wireless RF reception of the interrogation signals. In such an embodiment, the control module 74 can then convey the signals 78 (and/or the content thereof) to the RFID tags 14 using the antennas 70 present in each cell 66, thereby interrogating the RFID tags 14 present in the respective cells 66 alternatively or additionally to the data collection device 10.

One or more of the RFID tags 14 responds to the signals 78 with the signal(s) 80, such as return signals containing data pertaining to the respective objects 74. The control module 74 monitors such signal(s) 80 at the block 96 via the antennas 70 present in each cell 66 or via the communication link 77. Such monitoring by the control module 74 can include, for instance, detecting and recording the content of the data encoded in the signal(s) 80 (e.g., identifiers of the responsive RFID tags 14, information pertaining to the objects corresponding to the responsive RFID tags 14, and/or other data), which RFID tag(s) 14 in corresponding cells 66 responded with the signal 80 and which did not, output level of the signal(s) 80, the location (or other identifier) of the specific cells 66 corresponding to the signal(s) 80 from responsive RFID tags 14, and so forth.

In some embodiments, only RFID tags 14 of potential objects 72 of interest may respond with the return signals 80 while RFID tags 14 of other objects 72 present in the carrier structure 62 may not respond at all with signals. For example, such RFID tags 14 of other objects 72 may not provide return signals if these RFID tags 14 are: (1) incompatible with the data collection device 10, (2) out of range or out of the field of the signals 78 from the data collection device 10, (3) do not contain the information specifically being requested by the signal(s) 80, and/or otherwise non-responsive and therefore making their associated object(s) 72 a possible candidate as a non-object of interest.

If the data collection device 98 is able to establish a communication with one or more RFID tags 14 at a block 98, such as if the RFID tag(s) 14 generate and return the signal(s) 80 that are received by the data collection device 10, then the method 90 moves to a block 100. Otherwise, the data collection device 10 repeats the interrogation operations at the block 96 by resending the signals 78.

At a block 100, the data collection device 10 is used to select one or more of the responsive RFID tags 14 as being associated with the object of interest, and the data collection device 10 sends a notification signal to the control module 74 via the communication link 77. For instance at the blocks 96-100, the data collection device 10 may receive signals 80 from a plurality of responsive RFID tags 14 present in different cells 66, while other RFID tags 14 in other cells 66 may not respond at all. By way of illustration, one of the responsive RFID tags 14 (in a particular cell 66) is affixed to an object 72 in the form of a container having a drug X. Another one of the responsive RFID tags 14 is affixed to another object 72 (in a different cell 66) in the form of a container having a drug Y. Yet another one of the responsive RFID tags 14 is affixed to another object 72 (in yet another different cell 66) in the form of a container having a drug Z. The signals 80 from these responsive RFID tags 14 would thus contain identification information for the particular drug stored in each of the respective containers. The non-responsive RFID tags 14 are attached to objects in the form of empty drug containers or medical instruments, for example.

The data collection device 10 is able to present the container content information (obtained by decoding the signal 80 from the responsive RFID tags 14) from each of the responsive RFID tags 14 on the visual indicator 56 (such as a display output screen) of the data collection device 10. Thus, the visual indicator 56 of the data collection device 10 will display drugs X, Y, and Z in this example. Assuming that the user of the data collection device 10 is looking for the drug X, the user can then use the user input device 54 to select the drug X on the visual indicator 56 as the object of interest.

In response to selection of the drug X, the data collection device 10 generates the notification signal and sends the notification signal to the control module 74, using the communication port 52 and the communication link 77. In an embodiment, the notification signal contains an identifier (such as a serial number or other alphanumeric code) of the specific RFID tag 14 associated with the object 72 of interest (e.g., the drug X) and/or contains at least some of the information (e.g., drug X identification information) encoded in or otherwise present in the signal 80 received from the RFID 14 associated with the object 72 of interest.

In response to receiving the notification signal from the data collection device 10 at the block 100, the control module 74 identifies and selects the particular cell 66 having the object 72 of interest (e.g., the cell 66 having the container of drug X in this example) at a block 102. There are a number of possible ways in which the control module 74 can make this identification and selection at the block 102.

In one embodiment, the control module 74 processes the notification signal by obtaining the identifier of the particular RFID tag 14 from the notification signal, and correlates this obtained identifier with the various identifiers previously monitored (and stored) by the control module 74 for the cells 66 when the various interrogated RFID tags 14 responded with the signals 80 at the block 96. The control module 74 is then able to identify the specific cell 66 that matches the identifier of the RFID tag 14 at the block 102.

In another embodiment, the control module 74 obtains (such as by decoding, using decoding components similar to the data collection device 10) the information associated with the object 72 of interest (e.g., drug X information) from the notification signal, and correlates this obtained information with the monitored information (which was also decoded and stored) by the control module 74 for the cells 66 when the various interrogated RFID tags 14 responded with the signals 80 at the block 96. The control module 74 is then able to identify the specific cell 66 that matches the information associated with the object 72 of interest at the block 102.

In yet another embodiment, if only one RFID tag 14 in the carrier structure 62 responded to the signal 78 from the data collection device 10, and the data collection device 10 subsequently provided the notification signal to control module 74, then the control module 74 can select the particular cell 66 that contains the corresponding object 72. In such an embodiment, the control module 74 need not necessarily extract or otherwise obtain specific information from the notification signal (e.g., an identifier of a specific RFID tag 14, information associated with the object 72 of interest, etc.) in order to identify a specific cell 66 at the block 102, since only one cell 66 had a responsive RFID tag 14 and the location/identity of that cell was known to the control module 74 during the monitoring at the block 96.

At a block 104, the control module 74 initiates activation of the indicator 76 associated with the selected cell 66 having the object 72 of interest. For example, if the indicator 76 is an LED, the control module 74 can send a control signal to turn ON that LED. The indicator 76 is then activated at a block 106.

If the user subsequently removes the object 72 of interest from its cell 66, then the control module 74 initiates deactivation of the activated indicator 76 associated with that cell 66 at a block 108. For example, if the activated indicator 76 is an LED that is turned ON, then the control module 74 can send another control signal to turn OFF that LED at the block 108. The indicator 76 is then deactivated at a block 110.

From the above description, it can be seen that the system 60 of FIG. 3 can be adapted for a number of various uses and has a number of advantages. Such advantages can include, but are not limited to, remotely selecting and locating the object 72 of interest, implementing the selection process without the necessity of having a line of sight to the object 72 of interest, selecting and locating the object 72 of interest from among other similar objects, increasing the productivity of operations involving the specific object 72 of interest by decreasing the time to locate that object 72 of interest, and so forth.

The various uses of the system 60 and method 90 can include but not be limited to the following fields: pharmacies, hospitals, assembly lines, shopping kiosks, airports, retail stores, and so forth.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, embodiments have been described above in which the RFID tags 14 are attached to objects 72, and provide data pertaining to the objects 72. In other embodiments, the RFID tags 14 may be provided with sensor elements, such that the RFID tags 14 can detect and collect data regarding temperature, humidity, air pressure, lighting levels, presence of certain chemical substances, presence and strength of electromagnetic or other types of signals, or other environmental condition (within or in the vicinity of the cells) that can be sensed and stored by the RFID tags 14. Such detected and collected data can then be provided to the RFID reader and/or control module 74 when the RFID tag 14 is interrogated.

Furthermore, various embodiments have been described above in the context of the data carrier being in the form of an RFID tag 14. It is appreciated that other embodiments can be provided for use with other types of data carriers, such as acoustical tags. In such other embodiments, the cells of the carrier frame 64 can be structured to prevent or decrease the propagation or distribution of acoustic waves between cells 66. Moreover, the control module 74 and the data collection device 10 can communicate or otherwise cooperate with each other in a manner similar to the embodiments above, so as to select and locate an object 72 of interest. In such implementations, the data collection device 10 can be a single mode device to communicate with acoustical tags or a multi-mode device that can communicate with acoustical tags and other types of data carriers (such as RFID tags, barcodes, matrix codes, stacked codes, and the like). In such embodiments of the data collection device 10, input and output transducers and other acoustical components can be provided in the data collection device 10 to allow communication of acoustical signals with the acoustical tag(s), alternatively or additionally to the components described above for communicating with RFID tags 14. Further, input and output transducers can be provided instead of the antennas 70 in the cells 66 of the carrier structure 62 to send/receive acoustical signals.

Embodiments have been described above in which one of the indicators 76 is activated to identify the location of an object 72 of interest. In another embodiment (at the block 104 of FIG. 4), the control module 74 can initiate deactivation of the indicator 76 associated with the selected cell 66 having the object 72 of interest. In such an embodiment, indicators 76 are activated by default, and then one of the indictors 76 is deactivated to identify a corresponding object 72 of interest.

In the embodiments described above, various signals have been described as being an RF signal. It is understood that the RF signal(s) can be included in at least the radio band and microwave band of frequencies.

These and other modifications can be made to the embodiments in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system, comprising:
    a carrier structure having a plurality of cells to allow objects having respective data carriers affixed thereon to be placed in respective ones of the cells, each cell including an antenna to receive signals from a data carrier affixed on an object that is placed in the cell;
    a plurality of indicators, each indicator respectively associated with each of the plurality of cells;
    an automatic data collection device to:
        communicate with the data carriers affixed to the objects placed in the respective ones of the cells by interrogating the data carriers and receiving signals generated by one or more data carriers in response to the interrogation;
        select at least one of the one or more data carriers affixed to one of said objects that is an object of interest based on the signals received from the one or more data carriers; and
        provide a notification signal to indicate the selection of the at least one of the one or more data carriers; and
    a control module communicatively coupled to each cell via the antenna included in the cell and via the indicator associated with the cell, the control module being adapted to:
        monitor the signals generated by the one or more data carriers in response to the interrogation and received by the antennas included in the respective cells;
        receive the notification signal from the data collection device; and
        select at least one of the indicators to activate, the selected indicator being associated with one of said cells that has the object of interest placed therein and being adapted to provide an indication of a location of the object of interest,
    wherein the selection of the at least one of the indicators is based on a cell location information corresponding to each of the one or more data carriers and derived from the monitored signals and information associated with the at least one of the one or more data carriers contained in the received notification signal.

2. The system of claim 1 wherein the data carriers include RFID tags.

3. The system of claim 1 wherein the data carriers include acoustical tags.

4. The system of claim 1 wherein the carrier structure includes:
    a carrier frame on which the indicators are coupled;
    a plurality of walls attached to the carrier frame, the plurality of walls being arranged to define the plurality of cells of the carrier structure and having a material to attenuate propagation of waves between cells
    wherein the antenna present in each cell is communicatively coupleable with the control module to allow the control module to monitor the signals generated by the data carriers and received by the antennas.

5. The system of claim 4 wherein the data collection device is further communicates with the data carriers by generating at least one signal to interrogate the data carriers and selects said one of the data carriers based at least in part on the signal generated by said one of the data carriers and to provide a notification signal to the control module via a communication link to indicate selection of said one of the data carriers.

6. The system of claim 4 wherein the material of the walls at least partially is a metal-based material.

7. The system of claim 1 wherein the indication provided by the activated indicator includes a human-perceptible visual, audible, or tactile indication.

8. The system of claim 1 wherein the data collection device includes a handheld portable data collection device.

9. The system of claim 1 wherein the data collection device includes a stationary data collection device.

10. The system of claim 1 wherein the carrier structure is selected from a group comprising: a cart, an inventory shelf, a shipping container, a storage unit, a product holder, a vehicle, a room to hold people, and a file room.

11. An apparatus, comprising:
    a carrier structure having a plurality of cells, each cell to receive at least one object of a plurality of objects, each object having a respective data carrier affixed thereon, each cell including an antenna to receive information from a data carrier affixed on an object that is placed in the cell;
    a plurality of indicators, each indicator respectively associated with each of the plurality of cells; and
    a control module operatively coupled to each cell via the antenna included in the cell and via the indicator associated with the cell, and which:
        monitors signals generated by the one or more data carriers in response to interrogation by an automatic collection device and received by the antennas included in the respective cells; and selects at least one of the indicators to activate, the selected indicator being associated with one of said cells having one of said objects that is an object of interest received therein and being adapted to identify said one of said cells from other ones of the plurality of cells, the control module being adapted to select the indicator in response to selection by the automatic data collection device of one of said data carriers that is affixed to the object of interest and in response to a notification signal generated by said data collection device that is indicative of the selection of the one of said data carriers by the data collection device, wherein the selection of the at least one of the indicators is based on a cell location information corresponding to each of the one or more data carriers and derived from the monitored signals and information associated with the at least one of the one or more data carriers contained in the received notification signal.

12. The apparatus of claim 11 wherein the selected one of said data carriers that is affixed to the object of interest is an RFID tag.

13. The apparatus of claim 11 wherein the selected indicator is an LED indicator or liquid crystal display indicator that can be activated to indicate a location of the object of interest.

14. The apparatus of claim 11 wherein the carrier structure includes:

a carrier frame on which the indicators are coupled; and a plurality of walls attached to the carrier frame, the plurality of walls being arranged to define the plurality of cells of the carrier structure and having a material to substantially attenuate distribution of waves between the cells.

15. The apparatus of claim 14 wherein the control module is further adapted to receive at least one interrogation signal from the data collection device and to use the antennas present in the cells to convey the at least one interrogation signal to the data carriers of the objects received in the cells.

16. The apparatus of claim 14 wherein the signals monitored by the control module are generated by the data carriers in response to at least one interrogation signal directly sent by the data collection device to the data carriers.

17. The apparatus of claim 14 wherein the material of the walls at least partially includes a metal-based material.

18. The apparatus of claim 11 wherein the control module is further adapted to establish a communication link with the data collection device to carry the notification signal.

19. An article of manufacture, comprising:

a non-transitory computer-readable storage medium having instructions stored thereon that are executable by a processor to identify a location of an object of interest having a data carrier affixed thereon, by:

monitoring a return signal generated by the data carrier of the object of interest in response to an interrogation signal generated by an automatic data collection device, the object of interest being present in a cell of a carrier structure having a plurality of cells, other ones of said cells having other objects with data carriers respectively present therein, each cell including an antenna to receive return signals from a data carrier affixed on an object that is placed in the cell, the monitoring including receiving the return signal via the antenna associated with the cell;

processing a notification signal received from the data collection device, the notification signal being indicative of selection of the data carrier of the object of interest by the data collection device, the notification signal including information regarding the object of interest included in the return signal;

based on the processed notification signal and the monitored return signal of the data carrier of the object of interest, selecting the cell having the object of interest present therein by identifying, from the return signal received via the antenna associated with the cell, the cell having the object of interest that is specified by the information included in the notification signal; and initiating indication of the identified and selected cell to indicate the location thereof.

20. The article of manufacture of claim 19 wherein the instructions to initiate the indication includes instructions executable by said processor to identify the location of the object of interest, by:

initiating activation of an indicator associated with the identified and selected cell.

21. The article of manufacture of claim 20 wherein the non-transitory computer-readable storage medium further includes instructions stored thereon that are executable by said processor to identify the location of the object of interest, by:

initiating deactivation of the indicator in response to removal of the object of interest from the selected cell.

22. The article of manufacture of claim 19 wherein the instructions to initiate the indication includes instructions executable by said processor to identify the location of the object of interest, by:

initiating deactivation of an indicator associated with the identified and selected cell, indicators of other ones of said cells being activated to indicate non-selection of the objects respectively present therein.

23. The article of manufacture of claim 19 wherein the instructions to monitor the return signal includes instructions executable by said processor to identify the location of the object of interest, by:

monitoring a signal present within the cell of the object of interest using an antenna present in that cell, the signal present within that cell being substantially attenuated during propagation into other ones of the cells of the carrier structure.

24. A system comprising:

carrier means having a plurality of cells for respectively receiving a plurality of objects having respective data carriers affixed thereon, one of said plurality of objects being an object of interest and having a data carrier affixed thereon, each cell having an antenna means associated with the cell having an object received therein, for receiving return signals from a data carrier affixed on the object, the return signals being generated in response to an interrogation signal;

means for receiving a return signal generated by at least one data carrier in response to an interrogation signal, the return signal being present in a cell having the object received therein and being attenuated during propagation into other ones of said plurality of cells;

means for monitoring the return signal generated by the at least one data carrier with the antenna means located in the cell having the object with the at least one data carrier;

means for processing a notification signal indicative of selection of the data carrier of an object of interest, the notification signal including information regarding the object of interest included in the return signal; and means for selecting the cell having the object of interest received therein, based on the processed notification signal and the monitored return signal of the data carrier of the object of interest by identifying, from the return signal received via the antenna means associated with the cell, the cell having the object of interest that is specified by the information included in the notification signal; and means for indicating the identified and selected cell to indicate the location of the object of interest.

25. The system of claim 24, further comprising automatic data collection means for generating an interrogation signal to send to the data carrier of the object of interest, for selecting the data carrier of the object of interest, and for generating the notification signal indicative of the selection of the data carrier of the object of interest.

26. The system of claim 24 wherein the antenna means for receiving the return signal generated by the data carrier of the object of interest includes a transducer means, located in the cell having the object of interest received therein, for receiving the return signal, other ones of said plurality of cells having their respective transducer means for receiving return signals from respective other ones of the data carriers.

27. An automatic data collection apparatus configured to read a target data carrier, the apparatus comprising:

at least a first component adapted to send an interrogation signal to the target data carrier, the target data carrier being affixed to an object of interest that is located proximate to a plurality of other objects having respective data carriers affixed thereon;

at least a second component adapted to receive a return signal from the target data carrier in response to the interrogation signal, the return signal including first information pertaining to the object of interest;

an input device adapted to allow selection of the data carrier; and a communication port adapted to send a notification signal to an external device adapted to monitor the return signal from the target data carrier and to uniquely identify a location of the object of interest, the notification signal being indicative of the selection of the target data carrier and containing second information associated with the object of interest, the notification signal being usable by the external device to uniquely identify the location of the object of interest from locations of other ones of the plurality of objects through a correlation of the first information with the second information to find a match.

28. The apparatus of claim 27 wherein target data carrier is a target RFID tag, and wherein the at least the first component includes a radio and a first antenna coupled thereto to send a RF interrogation signal to the target RFID tag, the at least the second component including a second antenna to receive a RF return signal from the target RFID tag.

29. The apparatus of claim 27 wherein target data carrier is a target acoustical tag, and wherein the at least the first component includes a first transducer to send an acoustical interrogation signal to the target acoustical tag, the at least the second component including a second transducer to receive an acoustical return signal from the target acoustical tag.

30. A method for locating an object of interest from a plurality of objects having RFID data carriers affixed thereon, the method comprising:

initializing an automatic data collection device and a control module of a carrier structure with a plurality of cells, the cells being adapted to allow objects having respective data carriers affixed thereon to be placed in respective ones of the cells, each cell including an antenna adapted to receive information from a data carrier affixed on an object that is placed in the cell;

establishing a communication link between the automatic data collection device and the control module of the carrier structure;

interrogating said data carriers with the automatic data collection device;

monitoring signals generated by the one or more data carriers in response to the interrogation with the automatic data collection device and received by the antennas included in the respective cells and associated with the control module;

in response to a selection of at least one of the one or more data carriers affixed to one of said objects as an object of interest based on the signals received from the one or more data carriers, sending a notification information to the control module of the carrier structure from the automatic data collection device that the object of interest is identified; and selecting and initializing by the control module of the carrier structure an indicator associated with a respective cell of the carrier structure where the object of interest is placed, the selecting being based on a cell location information corresponding to each of the one or more data carriers and derived from the monitored signals and information associated with the at least one of the one or more data carriers contained in the received notification information.

31. The method of the claim 30, further comprising displaying a location of the object of interest on a screen of the automatic data collection device.

32. The method of the claim 30, further comprising deactivating the indicator associated with the respective cell of the carrier structure after removal of the object of interest from said cell.

* * * * *